(12) United States Patent
Ward

(10) Patent No.: US 7,535,923 B2
(45) Date of Patent: *May 19, 2009

(54) APPARATUS AND METHOD FOR LOW COST, MULTI-PORT PROTOCOL ANALYSIS AND MONITORING

(75) Inventor: Robert Geoffrey Ward, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 661 days.

This patent is subject to a terminal disclaimer.

(21) Appl. No.: 11/047,629

(22) Filed: Feb. 2, 2005

(65) Prior Publication Data

US 2006/0171217 A1 Aug. 3, 2006

(51) Int. Cl.
*H04J 3/16* (2006.01)
*H04J 3/00* (2006.01)
*H04L 12/50* (2006.01)
*G06F 15/173* (2006.01)

(52) U.S. Cl. .................. 370/465; 370/378; 370/379; 370/381; 370/476; 709/224

(58) Field of Classification Search ........... 370/252, 370/241, 250, 253, 395.51, 419, 535, 465; 709/224

See application file for complete search history.

(56) References Cited

U.S. PATENT DOCUMENTS

| 5,430,722 | A | * | 7/1995 | Jacob et al. | 370/395.51 |
|---|---|---|---|---|---|
| 5,923,664 | A | * | 7/1999 | Aldebert et al. | 370/465 |
| 6,603,853 | B1 | * | 8/2003 | Bennett et al. | 379/265.01 |
| 6,912,359 | B2 | * | 6/2005 | Blumenthal et al. | 398/29 |
| 7,039,010 | B2 | * | 5/2006 | Ni | 370/229 |
| 7,110,778 | B2 | * | 9/2006 | Davis et al. | 455/456.1 |
| 7,120,121 | B2 | * | 10/2006 | Sikdar | 370/241 |
| 7,180,913 | B2 | * | 2/2007 | Benvenuti et al. | 370/476 |
| 2003/0004687 | A1 | * | 1/2003 | Seki | 702/188 |
| 2004/0024859 | A1 | * | 2/2004 | Bloch et al. | 709/223 |
| 2004/0076168 | A1 | * | 4/2004 | Patenaude | 370/406 |
| 2004/0179555 | A1 | * | 9/2004 | Smith | 370/521 |
| 2004/0225739 | A1 | * | 11/2004 | Ruhnow | 709/227 |
| 2005/0053075 | A1 | * | 3/2005 | Pelley et al. | 370/395.51 |
| 2006/0028992 | A1 | * | 2/2006 | Kangru | 370/241 |
| 2006/0126526 | A1 | * | 6/2006 | Walsh et al. | 370/252 |

* cited by examiner

*Primary Examiner*—Daniel J Ryman
*Assistant Examiner*—Cassandra Decker

(57) ABSTRACT

A multiport concentrator concentrates network data from different links in a network and carried on a plurality of lower speed lines into a stream of data carried on a higher speed line. A measurement system determines network statistics from the stream of data carried by the higher speed line.

9 Claims, 8 Drawing Sheets

US 7,535,923 B2

APPARATUS AND METHOD FOR LOW COST, MULTI-PORT PROTOCOL ANALYSIS AND MONITORING

BACKGROUND OF THE INVENTION

Distributed network analyzers (DNAs) are used to analyze data from a network. Generally, DNAs receive data from a network through a line interface module (LIM). The size of a LIM, however, limits the number of inputs physically available for the LIM to receive data from a network. Therefore, a respective DNA can only receive and analyze a relatively small amount of data because of the input limitation imposed by the LIM. As a result, a plurality of LIMs and DNAs are required to analyze a large amount of data from a network.

For example, FIG. 1 is a diagram illustrating the conventional use of DNAs to receive and analyze a large amount of data from in a network. Referring now to FIG. 1, a plurality of LIMs 10, 11, 12, and 13 receive a plurality of lines 1, 2, 3, and 4, respectively, which carry data from the network. DNAs 20, 21, 22 and 23 receive data from LIMs 10, 11, 12, and 13, respectively. Typically, the data carried by lines 1, 2, 3 and 4 is from a plurality of links in the network.

It is desirable to simultaneously monitor and analyze large quantities of data from a network. However, it is expensive to use a plurality of LIMs and DNAs. Moreover, the use of a plurality of LIMs and DNAs increases the size and complexity of the total amount of required equipment. In addition, there are difficulties in coordinating monitoring and analysis of a plurality of DNAs.

BRIEF DESCRIPTION OF THE DRAWINGS

Objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
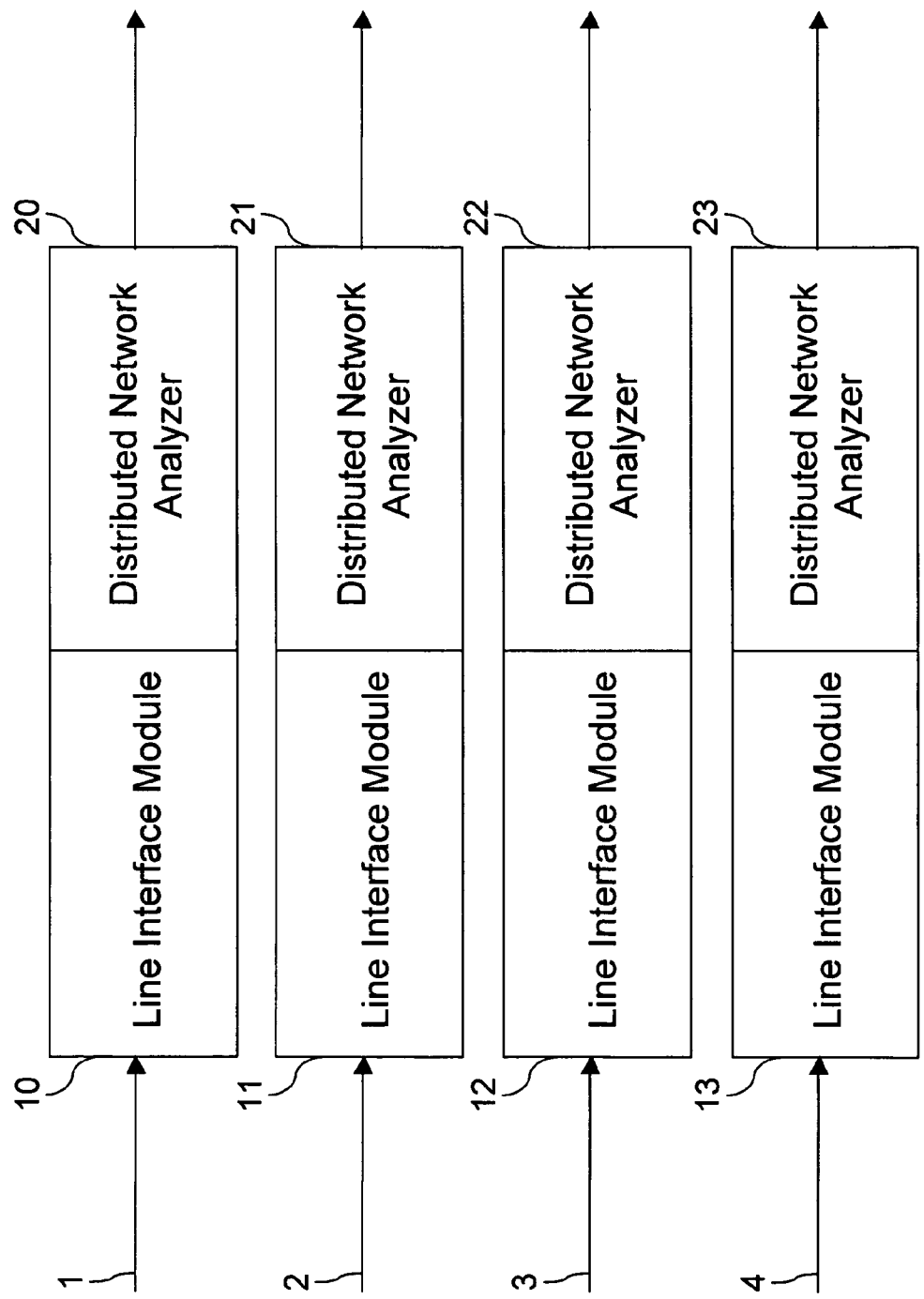
FIG. 1 (Prior Art) is a diagram illustrating the conventional use of LIMs and DNAs to receive and analyze a large amount of data from in a network.

Reference will now be made in detail to the present preferred embodiments of the present invention, examples of which are illustrated in the accompanying drawings, wherein like reference numerals refer to like elements throughout.

Figure 2:
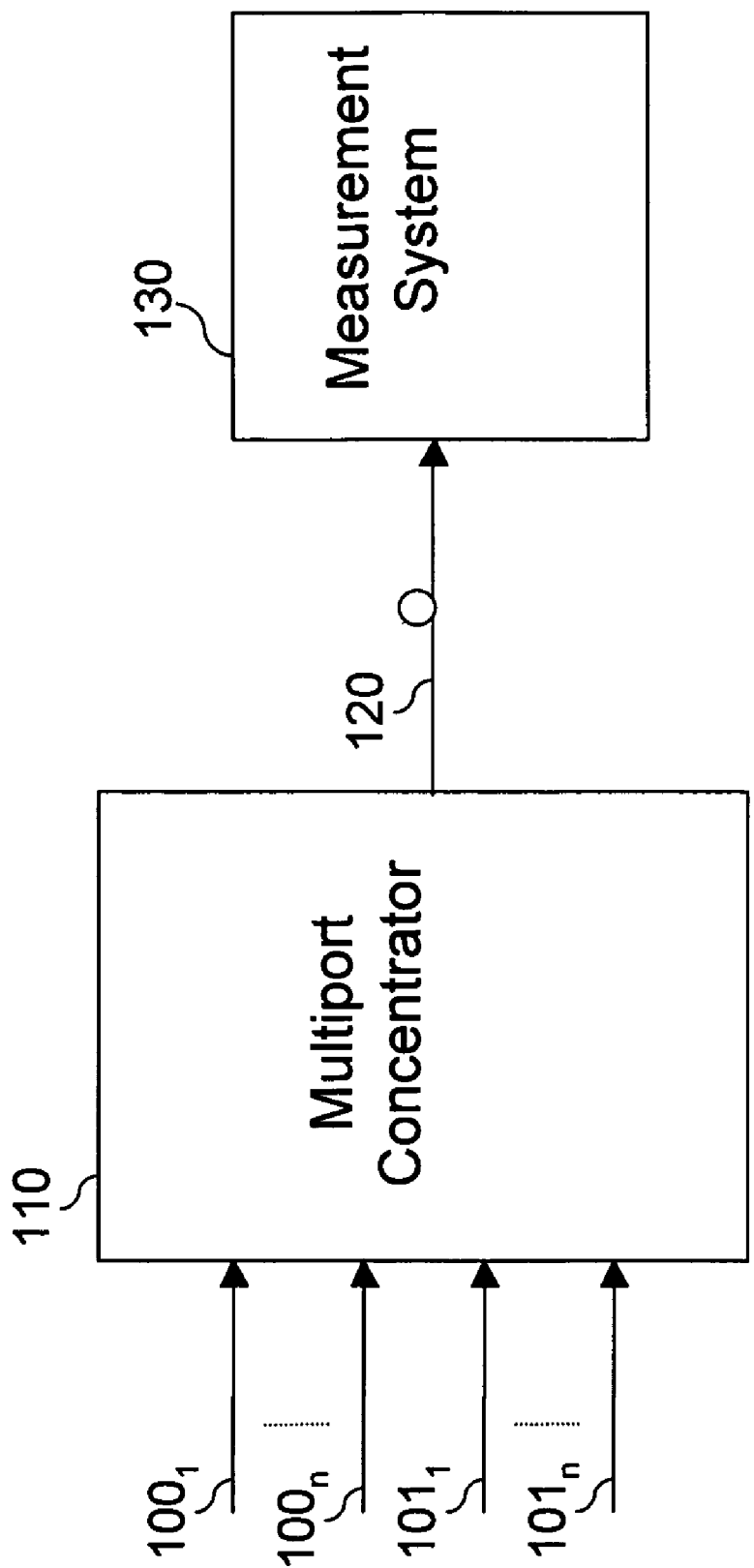
FIG. 2 is a block diagram illustrating an apparatus for concentrating a plurality of electrical signals for processing by a measurement system, according to an embodiment of the present invention.

FIG. 2 is a block diagram illustrating an apparatus for concentrating a plurality of electrical signals for processing by a measurement system, according to an embodiment of the present invention. Referring to FIG. 2, lower speed lines $100_1 \ldots 100_n$ and $101_1 \ldots 101_n$ carry network data from different links in a network. For example, the lower speed lines may be T1 or E1 lines. However, the present invention is not limited to lines being at any particular speed/rate or operating in any particular protocols.

Multiport concentrator 110 concentrates the network data carried by the lower speed lines $100_1 \ldots 100_n$ and $101_1 \ldots 101_n$ into a stream of data carried by higher speed line 120. The higher speed line 120 has a greater bandwidth than that of the respective lower speed lines $100_1 \ldots 100_n$ and $101_1 \ldots 101_n$. For example, if the lower speed lines $100_1 \ldots 100_n$ and $101_1 \ldots 101_n$ are T1 lines or E1 lines, capable of carrying 1.544 Mbps and 2.048 Mbps, respectively, the higher speed line 120 may be an OC-12 line, which is capable of carrying 622.08 Mbps. However, the higher speed line 120 of the present invention is not limited to being at any particular speed/rate or operating on any particular protocol. Further, the multiport concentrator 110 of the present invention, as illustrated in FIG. 2, is not limited to receiving any particular number of lines.

The measurement system 130 then determines network statistics from the concentrated network data carried by the higher speed line 120.

Figure 3:
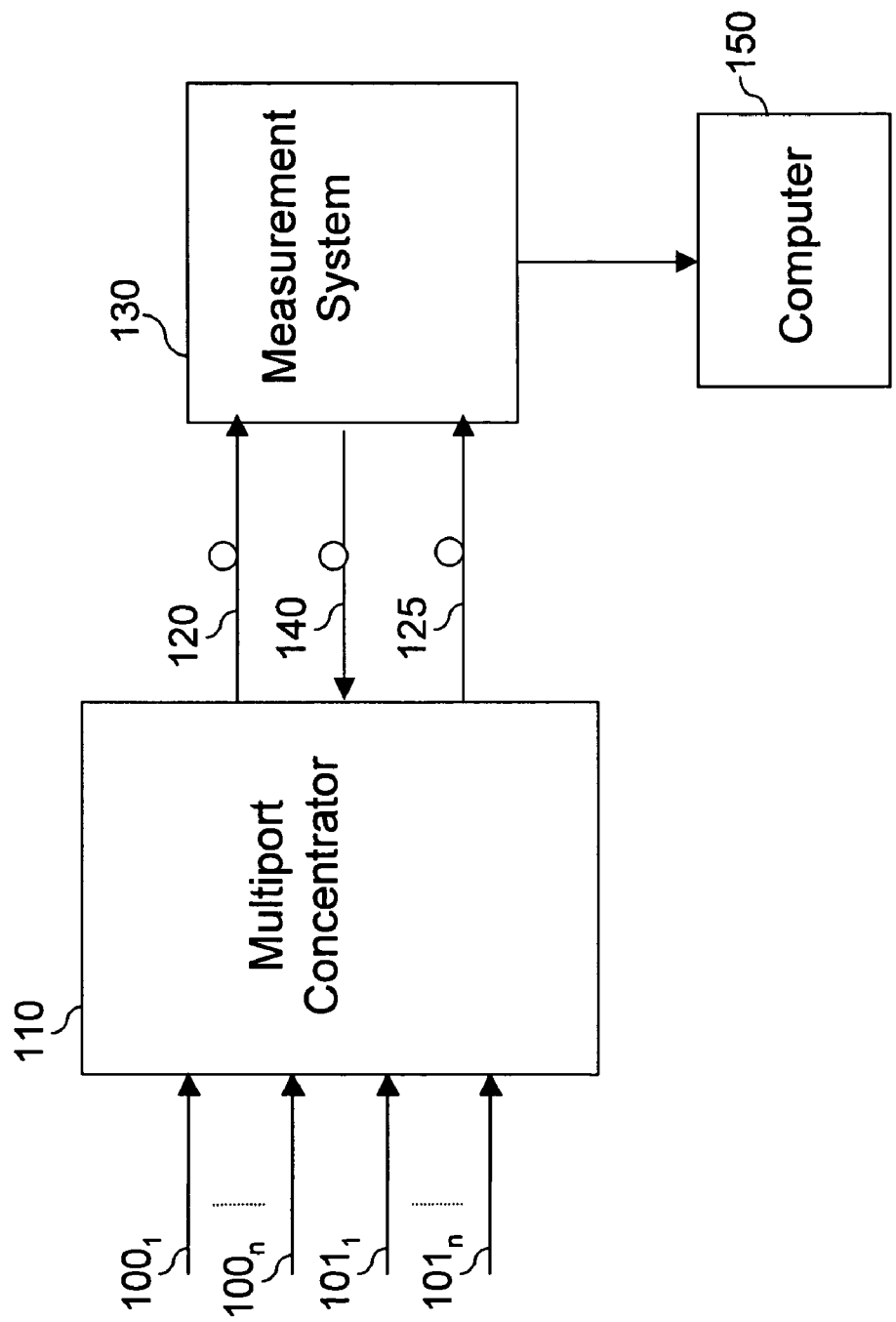
FIG. 3 is a block diagram illustrating a more detailed apparatus for concentrating a plurality of lower speed lines for processing by a measurement system, according to embodiments of the present invention.

FIG. 3 is a block diagram illustrating a more detailed apparatus for concentrating a plurality of lower speed lines for processing by a measurement system, according to embodiments of the present invention. Referring to FIG. 3, the plurality of lower speed lines $100_1 \ldots 100_n$ and $101_1 \ldots 101_n$ carry network data from different links in the network. For example, lower speed lines $100_1 \ldots 100_n$ and $101_1 \ldots 101_n$ may be T1 lines or E1 lines. The lower speed lines of the present invention, however, are not limited to being at any particular speed/rate or operating on any particular protocol. Additionally, as illustrated in FIG. 3, the apparatus of the present invention is not limited to any particular number of lower speed lines.

Multiport concentrator 110 concentrates the network data from the different links in the network carried by the lower speed lines $100_1 \ldots 100_n$ and $101_1 \ldots 101_n$ into higher speed lines 120 and 125, which may be OC-12 lines. Higher speed lines 120 and 125 have greater bandwidth than that of the each of the respective lower speed lines $100_1 \ldots 100_n$ and $101_1 \ldots 101_n$. For example, if the lower speed lines $100_1 \ldots 100_n$ and $101_1 \ldots 101_n$ are T1 or E1 lines, capable of carrying 1.544 Mbps and 2.048 Mbps, respectively, higher speed lines 120 and 125 may be OC-12 lines, which are capable of carrying 622.08 Mbps. However, higher speed lines 120 and 125 of the present invention are not limited to being at any particular speed/rate or operating on any particular protocol. Further, while FIG. 3 illustrates two groups of lower speed lines being concentrated into two higher speed lines, the present invention is not limited to any particular number of lower speed lines and higher speed lines, or any particular number of groupings.

Further, multiport concentrator 110 may collect telemetry data from each of the respective lower speed lines $100_1 \ldots 100_n$ and $101_1 \ldots 101_n$ on a per-port basis. The collected telemetry data may include, for example, statistics and alarms such as line code violations, cyclic redundancy check (CRC) errors, remote error indication (REI) counts, loss of signal (LOS), out of frame (OOF) data, alarm indication signal (AIS), and remote defect indication (RDI) for each of the respective lower speed lines. Multiport concentrator 110 inserts these errors into the concentrated stream of data on a per-port basis. These statistics and alarms are well known. The telemetry data of the present invention is not limited to these statistics and alarms.

The concentrated stream of data is framed in a SONET/SDH frame structure. For example, if the network data were to be multiplexed into an OC-12 line, the concentrated stream of data would be framed in an OC-12 frame. The present invention, however, is not limited to using an OC-12 frame. Further, the concentrated data may be structured as an asynchronous transfer mode (ATM) cell or a high-level data link control (HDLC) frame or a transcoder and rate adaption unit (TRAU) frame. The SONET/SDH frame structure allows for the multiport concentrator 110 to produce a concentrated stream of data which can be transmitted over an existing SONET/SDH network. The frame structure of the present invention, however, is not limited to an OC-12 frame suitable for transmission over a SONET/SDH network.

Further, a remote link 140 allows for remote control of the interface type of the lower speed lines $100_1 \ldots 100_n$ and $101_1 \ldots 101_n$ using measurement system 130. The interface type may be, for example, configured as T1 or E1. Different types of digital transmission links are well known. Additionally, the multiport concentrator 110 includes software which may be upgraded using this remote link 140 from the measurement system 130.

Measurement system 130 receives the higher speed lines 120 and 125 carrying the concentrated stream of data and extracts a plurality of streams of data, each extracted stream of data containing network data carried on one lower speed line in the network and telemetry data corresponding to that line. Network data from the different links in the network can then be analyzed by a single measurement system. Measurement system 130 is connected to computer 150 for analysis of telemetry data and may be, for example, a personal computer or a handheld computer, but is not limited to any particular type of computer.

Figure 4:
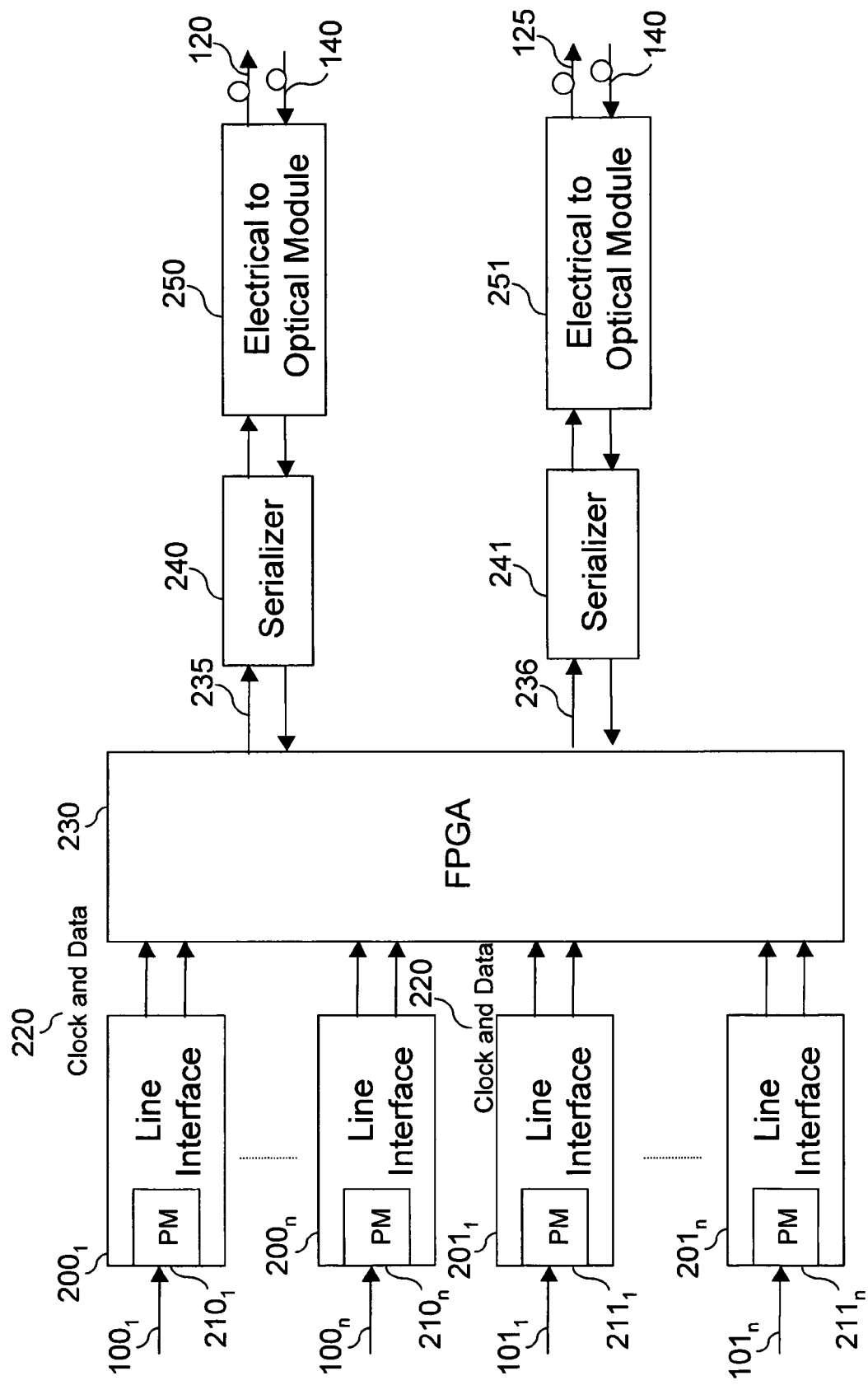
FIG. 4 is a block diagram illustrating a more detailed multiport concentrator, according to an embodiment of the present invention.

FIG. 4 is a block diagram illustrating a more detailed multiport concentrator 110, according to an embodiment of the present invention. As shown in FIG. 4, each of a plurality of lower speed lines $100_1 \ldots 100_n$ and $101_1 \ldots 101_n$ are received by line interfaces $200_1 \ldots 200_n$ and $201_1 \ldots 201_n$, respectively. Each of the plurality of line interfaces $200_1 \ldots 200_n$ and $201_1 \ldots 201_n$ includes a power meter (PM) $210_1 \ldots 210_n$ and $211_1 \ldots 211_n$, respectively. The power meters $210_1 \ldots 210_n$ and $211_1 \ldots 211_n$ measure the power of lower speed lines $100_1 \ldots 100_n$ and $101_1 \ldots 101_n$, respectively. Measurement of power is well known. The power measurements are collected as a part of telemetry data. The optical power of each of the plurality of lower speed lines $100_1 \ldots 100_n$ and $101_1 \ldots 101_n$ is, for example, a critical level-one measurement that can indicate problems with the network. Examples of problems that a measurement of power in the line interfaces may indicate include excessive connection losses, tampering with the connection, or degrading source output levels.

Further, because power measurements are taken for each of the plurality of lower speed lines $100_1 \ldots 100_n$ and $101_1 \ldots 101_n$, any problems detected can be traced to the lower speed line experiencing the problem.

As indicated in FIG. 4, clock and data 220 is used to convey the plurality of electrical signals. The electrical signals are then concentrated in field programmable gate array (FPGA) 230. FPGA 230 frames the multiplexed data in a synchronous optical network (SONET)/synchronous digital hierarchy (SDH) frame structure. FPGA 230 allows for the telemetry data to be inserted into the concentrated stream of data on a per-port basis. Accordingly, both the concentrated network data and the telemetry data corresponding to the lower speed lines can be carried by the same higher speed line.

FIG. 4 illustrates multiplexing two groups of lower speed lines. For example, FIG. 4 illustrates a first group of lower speed lines $100_1 \ldots 100_n$ being concentrated into a SONET/SDH electrical signal 235 and a second group of lower speed lines $101_1 \ldots 101_n$ being concentrated into SONET/SDH electrical signal 236. SONET/SDH electrical signals 235 and 236 are then serialized in serializers 240 and 241, respectively. The SONET/SDH electrical signals 235 and 236 are serialized so that the data carried by each of the SONET/SDH electrical signals can be carried by two optical fibers 120 and 125, respectively. The serialized electrical signals 235 and 236 are converted from SONET/SDH electrical signals to optical signals in electrical to optical modules 250 and 251, respectively.

The higher speed lines 120 and 125, which may be OC-12 lines, then carry network data previously carried by the plurality of lower speed lines $100_1 \ldots 100_n$ and $101_1 \ldots 101_n$, such as T1 lines or E1 lines, and the inserted telemetry data. The higher speed lines 120 and 125 have greater bandwidth than that of the lower speed lines $100_1 \ldots 100_n$ and $101_1 \ldots 101_n$. For example, if the lower speed lines $100_1 \ldots 100_n$ and $101_1 \ldots 101_n$ are T1 lines or E1 lines, each capable of carrying 1.544 Mbps or 2.048 Mbps, respectively, the higher speed lines 120 and 125 may be OC-12 lines, which are capable of carrying 622.08 Mbps. However, the higher speed lines 120 and 125 of the present invention are not limited to OC-12 lines.

As also indicated in FIG. 4, the remote link 140 allows for remote control of the interface type of the lower speed lines $100_1 \ldots 100_n$ and $101_1 \ldots 101_n$ using measurement system 130. The interface type may be, for example, configured as T1 or E1. However, the present invention is not limited to any particular interface types. Different types of digital transmission links are well known. Additionally, the multiport concentrator software may be upgraded using this remote link 140 from the measurement system 130.

Figure 5:
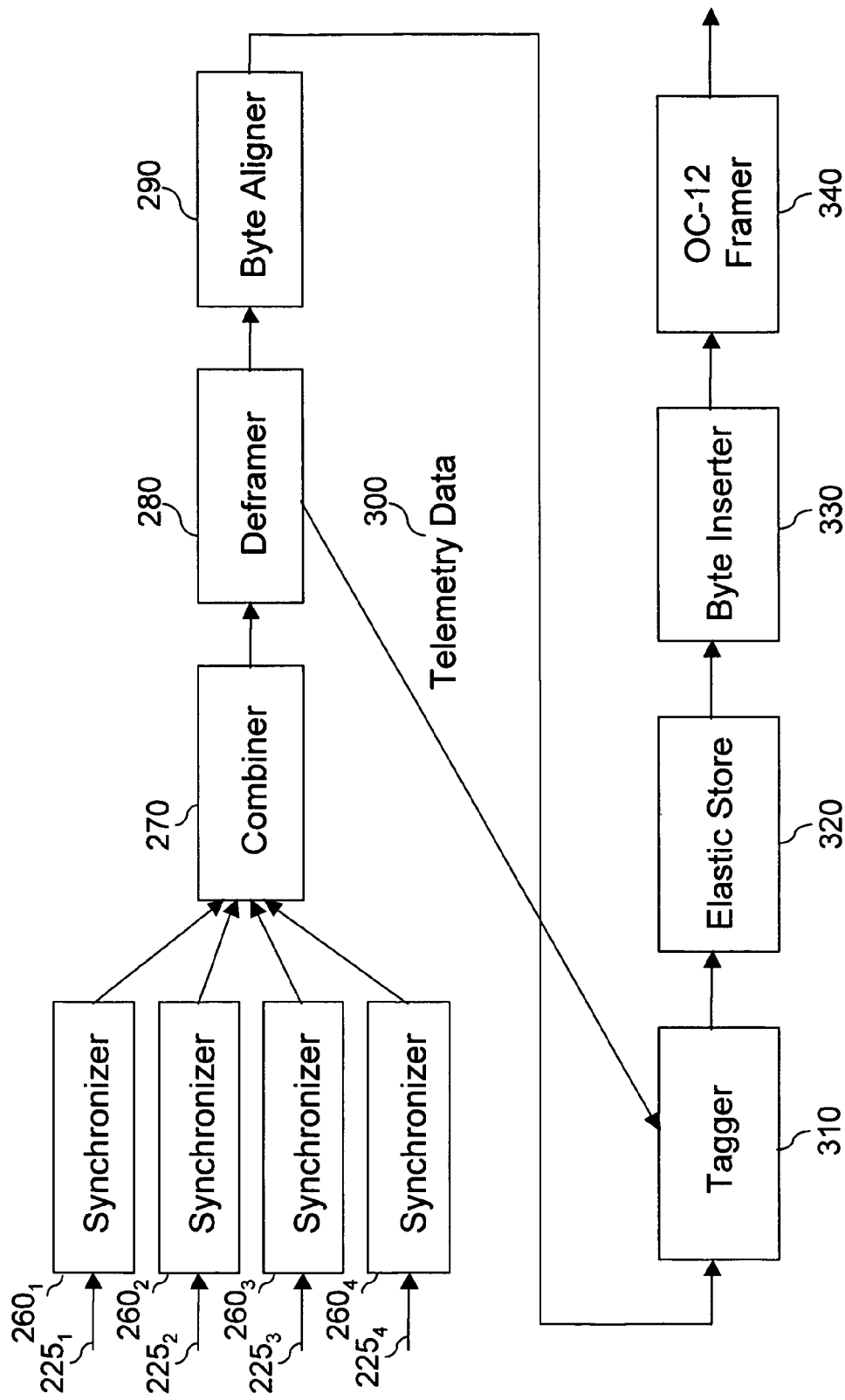
FIG. 5 is a block diagram illustrating a more detailed field programmable gate array (FPGA), according to an embodiment of the present invention.

FIG. 5 is a block diagram illustrating a more detailed FPGA 230, according to an embodiment of the present invention. More specifically, FIG. 5 provides a detailed description of FPGA 230 when FPGA 230 is selected to produce a data stream suitable for transmission on an ATM network.

The FPGA 230 receives electrical signals $225_1 \ldots 225_n$ and $226_1 \ldots 226_n$ from line interfaces $200_1 \ldots 200_n$ and $201_1 \ldots 201_n$, respectively. For example, if the present invention were to concentrate two groups of lower speed lines, each group consisting of four lower speed lines, the structure of the FPGA 230 shown in FIG. 5 would be repeated to accommodate additional lower speed lines. The multiplexer of the present invention is not limited to multiplexing a specific number of lower speed lines.

Synchronizers $260_1$, $260_2$, $260_3$, and $260_4$ then synchronize the electrical signals $225_1$, $225_2$, $225_3$, and $225_4$ according to the local clock domain. Synchronization of the electrical signals is known in the art. The synchronized electrical signals $225_1$, $225_2$, $225_3$, and $225_4$ are then interleaved into a single data stream in combiner 270. The process of interleaving synchronized electrical signals is well known. Because the electrical signals $225_1$, $225_2$, $225_3$, and $225_4$ are combined into a single data stream, processing in the FPGA 230 is more cost effective.

Deframer 280 detects the framing pattern of the data stream, which identifies the payload carried by the data stream. T1 and E1 framing patterns and the process of detecting T1 and E1 framing patterns are well known. Further, the deframer 280 detects statistics and alarms such as line code violations, cyclic redundancy check (CRC) errors, remote error indication (REI) counts, loss of signal (LOS), out of frame (OOF) data, alarm indication signal (AIS), and remote defect indication (RDI) for each of the respective lower speed lines. These statistics and alarms are well known, and are included in the telemetry data 300.

If the framing pattern detected by deframer 280 is a T1 framing pattern, for example, byte aligner 290 simultaneously takes each of the 193 bit T1 frames and converts them to 25 byte frames, where the framing bit is padded to a whole byte. Tagger 310 then places a two byte tag on each of the aligned T1 bytes. Each of these two byte tags contains a 6 bit byte number, a 6 bit port number, and 4 bits of telemetry data 300 pertaining to the respective port number. Thus, tagger 310 converts each aligned T1 byte into a three byte triplet. These three byte triplets are stored in elastic store 320, pending insertion into the OC-12 frame. Byte inserter 330 then inserts the byte triplets into a 9×1044 byte STS12c-/VC4-4c. The OC-12 framer 340 then puts a proprietary frame around the 9×1044 byte STS12c-/VC4-4c. Unused bytes in the frame can be used to transfer other information, such as that relating to configuration.

If the framing pattern detected by deframer 280 is an E1 framing pattern, byte aligner 290 is unnecessary. Tagger 310 places a two byte tag on each and every byte of each E1. The two byte tag placed by tagger 310 includes a 6 bit byte number, a 6 bit port number, and 4 bits of telemetry data 300 pertaining to the respective port number. Thus, tagger 310 converts each E1 byte into a three byte triplet. These three byte triplets are stored in elastic store 320, pending insertion into the OC-12 frame. Byte inserter 330 then inserts the byte triplets into a 9×1044 byte STS-12c/AU4-4c. The triplets start at the first byte following the H3 byte and overwrite what would have otherwise been the path overhead. These three byte triplets are stored in elastic store 320, pending insertion into the OC-12 frame. Byte inserter 330 then inserts the byte triplets into a 9×1044 byte STS-12c/AU4-4c FIG. 5 shows a combiner, deframer, byte aligner, tagger, elastic store, byte inserter and OC-12 framer illustrated in specific SONET/SDH protocols. However, the present invention is not limited to the combiner, deframer, byte aligner, tagger, elastic store, byte inserter and OC-12 framer being based in any specific protocol.

Figure 6:
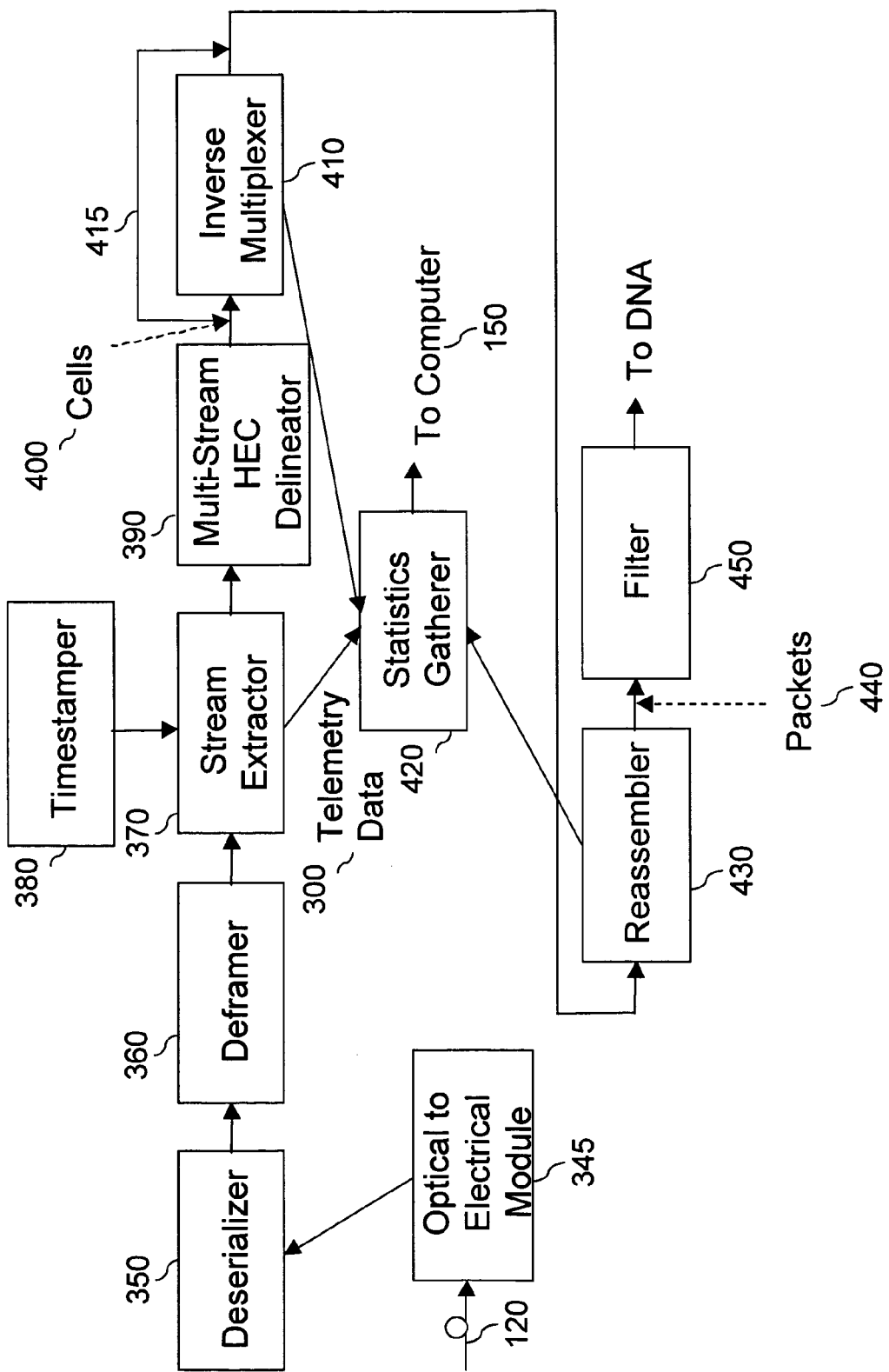
FIG. 6 is a block diagram illustrating a more detailed line interface module (LIM), according to an embodiment of the present invention.

FIG. 6 is a block diagram illustrating a more detailed line interface module (LIM), according-to an embodiment of the present invention. More specifically, FIG. 6 illustrates the deconstruction of the concentrated stream of data when the concentrated stream of data is configured for transfer over an ATM network. While FIG. 6 illustrates a LIM suited to receive a single higher speed line 120, the LIM of the present invention is not limited to receiving a single higher speed line. For example, if higher speed lines 120 and 125 were received from multiport concentrator 110, the structure illustrated in FIG. 6 would be duplicated to accommodate two higher speed lines.

The higher speed optical line 120 is input into optical to electrical module 345 of the LIM, which converts the signal carried by higher speed optical line into an electrical signal. Deserializer 350 then deserializes the converted electrical signal. Deframer 360 then deframes the deserialized electrical signal, extracting the payload. Stream extractor 370 then extracts a plurality of streams of data and telemetry data from the payload, each extracted stream corresponding to network data carried by a lower speed line. The extracted streams represent the network data in its original form, as carried by the lower speed lines. Further, the extracted streams and telemetry data 300 may be time stamped by time stamper 380. Time stamping, however, is not required. Extracted telemetry data 300 is sent to statistics gatherer 420 for further processing by a computer 150. Computer 150 may be, for example, a personal computer or a handheld computer. Multi-stream HEC delineator 390 then arranges the extracted data streams, for example, into 53 byte cells 400, as illustrated in FIG. 6.

As also indicated in FIG. 6, inverse multiplexer 410 may inverse multiplex the cells 400. For example, the data 400 may be inverse multiplexed over asynchronous transfer mode (ATM), which is a process also known as IMA. The present invention, however, is not limited to IMA or ATM, which are well known processes. If IMA occurs, the data will remain in 53 byte cells. Further, inverse multiplexing may not occur at all, as indicated by bypass line 415 in FIG. 6. Reassembler 430 then reassembles the inverse multiplexed data or, if the inverse multiplexer 410 is bypassed or not provided, the cells from multi-stream HEC delineator 390, into packets 440. Reassembler 430 reassembles the 48-byte payloads of the 53-byte cells into packets 440 using an ATM adaptation layer protocol (ML), such as AAL-2 or AAL-5. This protocol is well known. The present invention however is not limited to this protocol. Further, the length of the reassembled packets 440 may vary. These reassembled packets 440 can then be filtered 450 and analyzed by a distributed network analyzer (DNA).

Additionally, in the LIM, the telemetry data 300 inserted in concentrated data stream is extracted and gathered from stream extractor 370, inverse multiplexer 410, and reassembler 430 by statistics gatherer 420. Statistics gathered by statistics gatherer 420 are processed by computer 150. Computer 150 may be, for example, a personal computer or a handheld computer, and is not limited to any particular type of computer.

Figure 7:
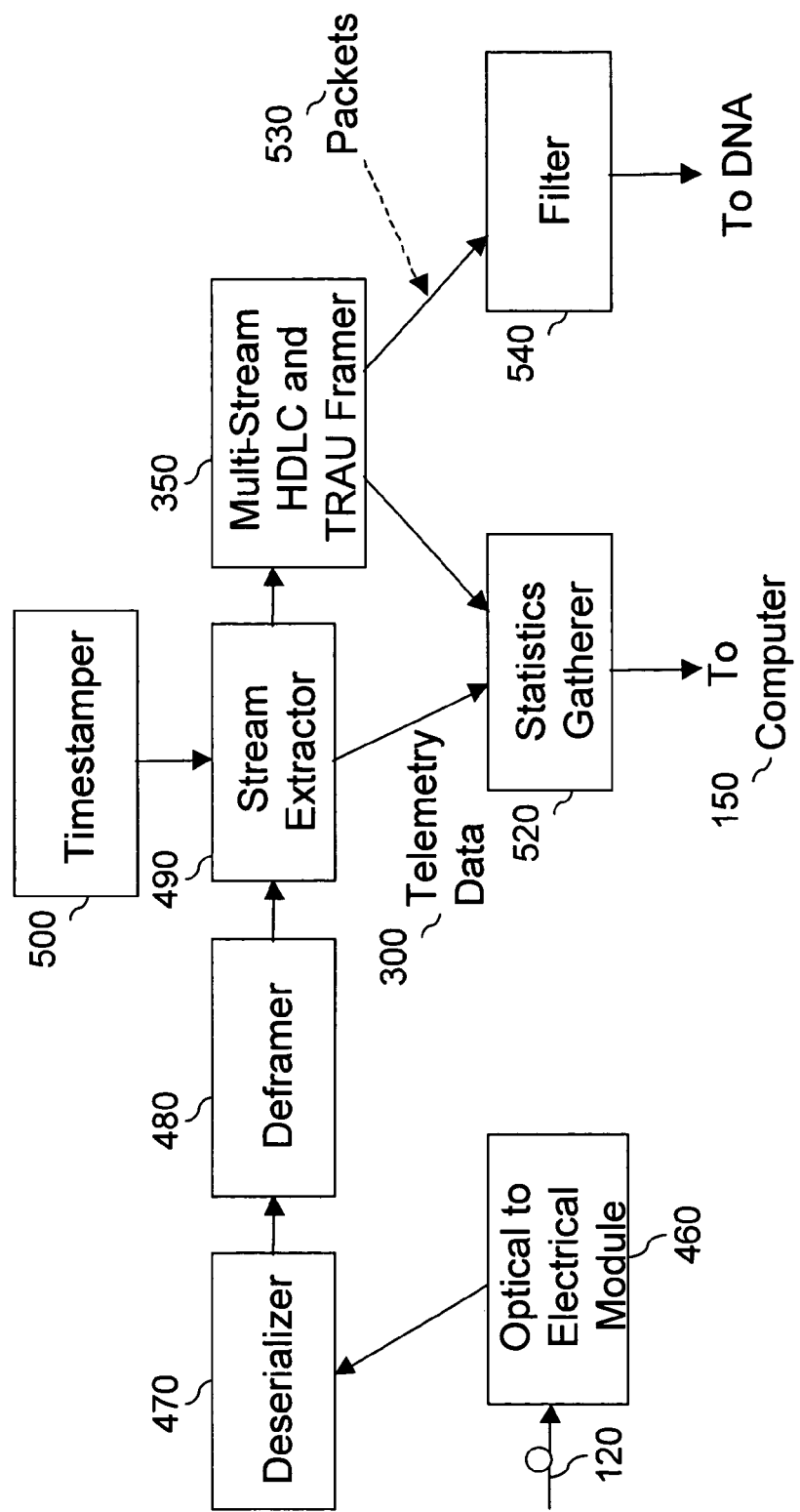
FIG. 7 is a block diagram illustrating a more detailed line interface module (LIM), according to an embodiment of the present invention.

FIG. 7 is a block diagram illustrating a more detailed line interface module (LIM), according to an embodiment of the present invention. More specifically, FIG. 6 illustrates the deconstruction of the concentrated stream of data when the concentrated stream of data is configured as HDLC or TRAU packets. While FIG. 7 illustrates a LIM suited to receive a single higher speed line 120, the LIM of the present invention is not limited to receiving a single higher speed line. For example, if higher speed lines 120 and 125 were received from multiport concentrator 110, the structure illustrated in FIG. 7 would be duplicated to accommodate two higher speed lines.

According to this embodiment, the higher speed optical line 120 is input into optical to electrical module 460 of the LIM, which converts the signal carried by higher speed optical line into an electrical signal. Deserializer 470 then deserializes the converted electrical signal. Deframer 480 then deframes the deserialized electrical signal, extracting the payload. Stream extractor 490 then extracts a plurality of streams of data and telemetry data from the payload, each extracted stream corresponding to network data carried by a lower speed line. The extracted streams represent the network data in its original form, as carried by the lower speed lines. Further, the extracted streams and telemetry data 300 may be time stamped by time stamper 500. Time stamping, however, is not required. Extracted telemetry data 300 is sent to statistics gatherer 520 for further processing by a computer 150. Computer 150 may be, for example, a personal computer or a handheld computer. Multi-stream HDLC and TRAU framer 510 then arranges the extracted data streams into packets 530, which are Filtered 540, as illustrated in FIG. 7. This protocol is well known.

Additionally, in the LIM, the telemetry data 300 inserted in concentrated data stream is extracted and gathered from stream extractor 490 and multi-stream HDLC and TRAU framer 510 by statistics gatherer 520. Statistics gathered by statistics gatherer 520 are processed by computer 150. Computer 150 may be, for example, a personal computer or a handheld computer, and is not limited to any particular type of computer.

Figure 8:
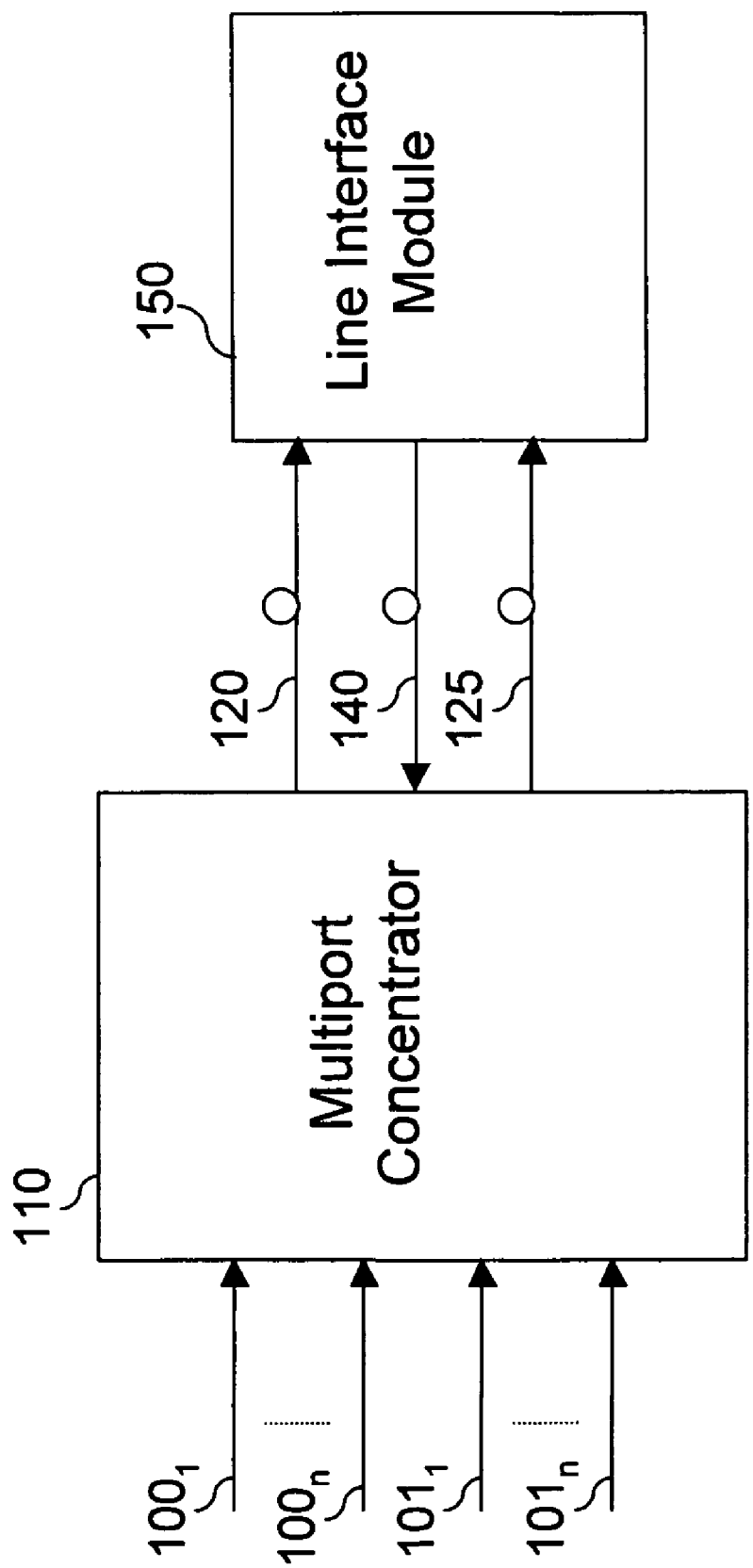
FIG. 8 is a block diagram illustrating an apparatus for concentrating a plurality of electrical signals for processing by a single line interface module, according to an embodiment of the present invention

FIG. 8 is a block diagram illustrating an apparatus for concentrating a plurality of electrical signals for processing by a single line interface module, according to an embodiment of the present invention. As shown in FIG. 8, the apparatus includes a multiport concentrator 110, which receives a plurality of lower speed lines $100_1 \ldots 100_n$ and $101_1 \ldots 101_n$, and a line interface module 550. Multiport concentrator 110, shown in greater detail in FIG. 3, concentrates data from different links in a network and carried on a plurality of lower speed lines $100_1 \ldots 100_n$ and $101_1 \ldots 101_n$ into concentrated streams of data carried on higher speed lines 120 and 125. LIM 550, examples of which are shown in greater detail in FIGS. 6 and 7 extracts a plurality of streams of data and telemetry data, packages the streams of data into cells, and reassembles the cells network data for further analysis.

According to the above, the present invention provides a method for concentrating a plurality of network data from different links in a network carried on a plurality of lower speed lines into streams of data carried on higher speed lines, deconstructing the concentrated stream of data, and simultaneously analyzing the network data from different links with a single measurement system using the deconstructed network data.

The present invention allows for remote placement of multiport concentrator 110, so long as it is connectable to measurement system 130 via one or more higher speed lines, such as an OC-12 line. Further, since less equipment is necessary to simultaneously analyze a plurality of optical inputs, the present invention allows for low cost, multi-port protocol analysis and monitoring. Further, the present invention allows for analysis and monitoring of multiple inputs using an existing measurement system, thus adding flexibility to an existing analysis and monitoring system. Additionally, as indicated in FIGS. 6 and 7, the present invention allows for analysis and monitoring of large quantities of data at a remote location because the multiport concentrator 110 is connectable to the measurement system 130 via an existing network, including the network being monitored.

Various protocols and standards have been described herein. However, the present invention is not limited to any specific protocols and/or standards.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus, comprising:
    a multiport concentrator concentrating network data from different links in a network and carried on a plurality of lower speed lines into a stream of data carried on a higher speed line, the multiport concentrator comprising:
        a plurality of line interfaces which connect the different links in the network to the multiport concentrator, each line interface including a power meter that collects telemetry data from the network data;
        a field programmable gate array (FPGA) synchronizing the network data; combining the synchronized data; deframing the combined data; gathering additional telemetry data from the combined data; tagging the deframed data, the telemetry data collected by the power meters, and the additional telemetry data collected by the FPGA; and framing the tagged data, the tagged telemetry data collected by the power meters, and the tagged additional telemetry data collected by the FPGA in a SONET/SDH frame structure;
        a serializer serializing the framed data; and
        an electrical to optical module converting the serialized data into an optical signal, the optical signal being the stream of data carried on the higher speed line; and
    a measurement system determining network statistics from the stream of data carried by the higher speed line.

2. The apparatus as in claim 1, further comprising a remote link with the measurement system controlling an interface type of the multiport concentrator.

3. The apparatus as in claim 1, wherein the multiport concentrator includes software for concentrating the network data, said software being upgradeable through a remote link.

4. The apparatus as in claim 1, wherein the measurement system comprises at least one of a line interface module or a distributed network analyzer.

5. The apparatus as in claim 1, wherein the measurement system comprises a line interface module, comprising:
    an optical to electrical module converting the stream of data carried on the higher speed line to an electrical signal;
    a deserializer deserializing the stream of data;
    a stream extractor extracting a plurality of streams of data, each extracted stream containing network data carried on one link in the network, and telemetry data; and
    a statistics gatherer collecting the telemetry data inserted in the stream of data for analysis by a computer.

6. The apparatus as in claim 5, wherein the line interface module further comprises: a multi-stream HEC delineator assembling the extracted streams of data into cells; and a reassembler reassembling the cells into packets for analysis by a single network analyzer.

7. The apparatus as in claim 6, wherein the line interface module further comprises an inverse multiplexer inverse multiplexing the assembled cells over ATM before reassembling the cells into the packets.

8. The apparatus as in claim 5, wherein the line interface module further comprises a multi-stream HDLC and TRAU framer grouping the extracted streams of data into packets for analysis by a single network analyzer.

9. The apparatus as in claim 1, wherein the multiport concentrator is located remotely, the concentrated stream of data is carried by the network, and the measurement system is located locally.

\* \* \* \* \*